United States Patent
Bagalá et al.

(10) Patent No.: US 11,146,425 B2
(45) Date of Patent: Oct. 12, 2021

(54) IO-LINK DEVICE

(71) Applicant: Datalogic IP Tech S.r.l., Lippo di Calderara di Reno (IT)

(72) Inventors: Fabio Bagalá, Bologna (IT); Marco Mestieri, Cento (IT)

(73) Assignee: DATALOGIC IP TECH S.R.L., Lippo di Calderara (IT)

( * ) Notice: Subject to any disclaimer, the term of this patent is extended or adjusted under 35 U.S.C. 154(b) by 0 days.

(21) Appl. No.: 16/958,808

(22) PCT Filed: Dec. 27, 2018

(86) PCT No.: PCT/IB2018/060642
§ 371 (c)(1),
(2) Date: Jun. 29, 2020

(87) PCT Pub. No.: WO2019/130231
PCT Pub. Date: Jul. 4, 2019

(65) Prior Publication Data
US 2021/0075644 A1    Mar. 11, 2021

(30) Foreign Application Priority Data
Dec. 29, 2017   (IT) .................. 102017000151097

(51) Int. Cl.
*H04L 25/02* (2006.01)
*H04B 3/02* (2006.01)

(52) U.S. Cl.
CPC ............. *H04L 25/028* (2013.01); *H04B 3/02* (2013.01); *H04L 25/0292* (2013.01)

(58) Field of Classification Search
CPC ............... H04L 25/028; H04L 25/0292; H04L 12/40019; H04W 84/18
See application file for complete search history.

(56) References Cited

U.S. PATENT DOCUMENTS 9,237,039 B2   1/2016   Cassata
9,641,259 B1   5/2017   Charlantini et al.
(Continued)

FOREIGN PATENT DOCUMENTS

DE        2161592 B1    3/2010
DE    202014104975 U1   1/2016

OTHER PUBLICATIONS

MAX14819,Dual IO-Link Master Transceiver with Integrated Framers and L+ Supply Controllers, Maxim Integrated, Aug. 2017 (Year: 2017).*

(Continued)

*Primary Examiner* — Aristocratis Fotakis
(74) *Attorney, Agent, or Firm* — Shook, Hardy & Bacon L.L.P.

(57) ABSTRACT

An IO-link device (20) configured as slave for transmitting/receiving signal data with a master module (19), the IO-link device comprising: a sensor or actuator (11) configured to produce output measurement signals; a first microcontroller (21) operatively coupled to the sensor or actuator and configured to receive the measurement signals and generate data based on the measurement signals, and a transceiving module (22) which comprises a physical layer transceiver (24) configured to receive/transmit signal data from/to the master module (19), and a second microcontroller (23) operatively coupled and in bi-directional communication with the transceiver, wherein the transceiver (24) is configured to receive signal data associated with a request from the master module (19) and transmit signal data associated with the request to the second microcontroller (23) and the second microcontroller (23) is configured to receive the signal data from the transceiver and to execute a device IO-Link protocol stack, the second microcontroller being operatively coupled and in bi-directional communication with the first microcontroller (21) for the transmission of (Continued)

signal data associated with the request to the first microcontroller and to receive data based on measurement signals from the first controller.

20 Claims, 2 Drawing Sheets

(56) References Cited

U.S. PATENT DOCUMENTS

| | | | |
|---|---|---|---|
| 10,133,702 B2 | 11/2018 | Boutaud | |
| 10,430,359 B2 | 10/2019 | Feinaeugle et al. | |
| 2008/0294915 A1* | 11/2008 | Juillerat | H04L 12/40032 713/300 |
| 2009/0279889 A1* | 11/2009 | Kirkpatrick | H04B 10/25752 398/41 |
| 2011/0197001 A1* | 8/2011 | Hsieh | G06F 13/42 710/110 |
| 2012/0110225 A1* | 5/2012 | Wessling | G06F 1/14 710/61 |
| 2014/0266340 A1* | 9/2014 | Huang | H03L 7/07 327/156 |
| 2015/0003503 A1* | 1/2015 | Cassata | H04L 25/028 375/219 |
| 2015/0143009 A1 | 5/2015 | Feinaeugle et al. | |
| 2016/0162433 A1* | 6/2016 | Kammerer | H04L 67/145 710/313 |
| 2016/0275045 A1 | 9/2016 | Boutaud | |
| 2019/0327662 A1* | 10/2019 | Franz | H04L 12/40019 |
| 2020/0080916 A1* | 3/2020 | Linne | G05B 19/0423 |
| 2020/0278943 A1* | 9/2020 | Schafer | G06F 13/4068 |
| 2020/0412571 A1* | 12/2020 | Campbell | H03K 3/037 |

OTHER PUBLICATIONS

TIDU681B, TI Designs IO-Link PHY BoosterPack, Texas Instruments, Mar. 2016 (Year: 2016).*

Ondrej Volf, IO-Link Device for testing of IO-Link Masters, Master's Thesis, Czech Technical University in Prague, Jan. 23, 2017 (Year: 2017).*

L6362A, IO-Link communication transceiver device IC, Datasheet, STMicroelectronics, Nov. 2017 (Year: 2017).*

TIDA-01335, Ultra-Small IO-Link Sensor Transmitter With RTD Front-End Reference Design, Texas Instruments, Aug. 2017 (Year: 2017).*

IO-Link Community, "IO-Link Interface and System, V1.1.2" http://www.io-link.com/share/Downloads/Spec-Interface/IOL-Interface-Spec_10002_V112_Jul13.pdf, 262 Pages, Jul. 2013.

IO-Link Community, "IO-Link Smart Sensor Profile 2nd Edition V1.0," http://www.io-link.com/share/Downloads/Smart-Sensor-Profile/IOL-Smart-Sensor-Profile-2ndEd_V10_Mar2017.pdf, 73 Pages, Mar. 2017.

IO-Link Community, "IO-Link Test V1.1.2," http://www.io-link.com/share/Downloads/Testspec/IOL-Test-Spec_10032_V112_Jul14.pdf, 397 Pages, Jul. 2014.

I0-Link Consortium, "I0-Link Communication, V1.0," https://pdfslide.net/documents/io-link-communication-file-name-iol-comm-spec10002v10090118doc-document.html, 134 Pages, Jan. 2009.

I0-Link Consortium, "IO-Link Smart Sensor Profile, V1.0" https://io-link.com/share/Downloads/IOL-Smart-Sensor-Profile-Spec_10042_V10_Oct11.pdf, 42 Pages, Oct. 2011.

International Search Report and Written Opinion dated Jun. 30, 2020 in International Patent Application No. PCT/IB2018/060642, 7 pages.

* cited by examiner

IO-LINK DEVICE

CROSS-REFERENCE TO RELATED APPLICATIONS

This application claims priority to International Application No. PCT/IB2018/060642, filed on Dec. 27, 2018, which claims priority to Italian Application No. 102017000151097, filed on Dec. 29, 2017, which are herein incorporated by reference.

SUMMARY

According to the present invention, an IO-Link device is provided which is configured as slave for transmitting/receiving signal data with a master module, the IO-link device comprising:
- a sensor or actuator configured to output measurement signals;
- a first microcontroller operatively coupled to the sensor or actuator and configured to receive the measurement signals and to generate data based on the measurement signals, and
- a transceiving module comprising a physical layer transceiver configured to receive/transmit signal data from/to the master module,
- the device comprising a second microcontroller operatively coupled to, and in bidirectional communication with, the physical layer transceiver, wherein the physical layer transceiver is configured to receive signal data associated with a request from the master module and transmit signal data associated with the request to the second microcontroller, and
- the second microcontroller is configured to receive the signal data from the physical layer transceiver and to execute a device IO-Link protocol stack, the second microcontroller being operatively coupled to, and in bidirectional communication with, the first microcontroller for the transmission of the signal data associated with the request to the first microcontroller and for the reception of data based on the measurement signals from the first controller in response to the signal data associated with the request.

DETAILED DESCRIPTION

Figure 1:
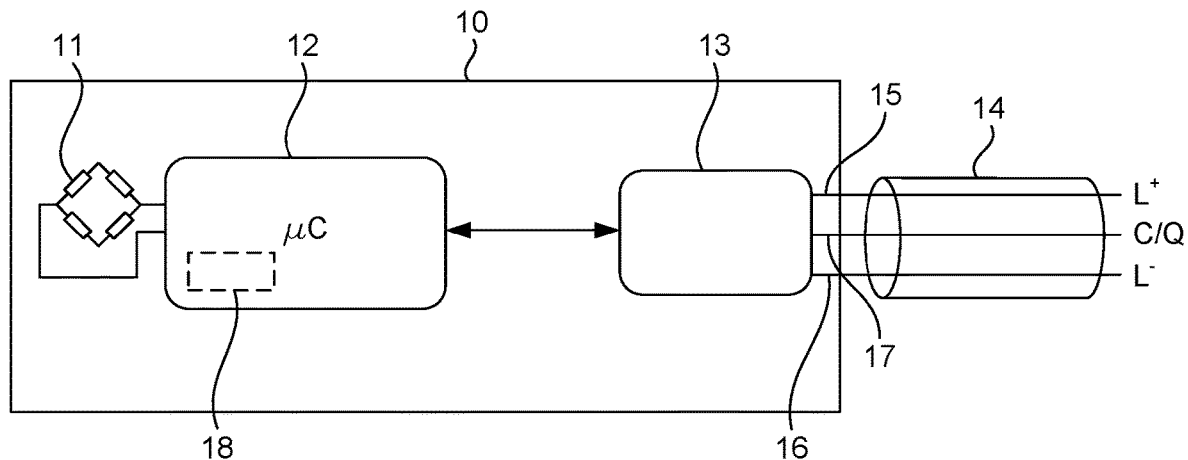
FIG. 1 is an exemplary block diagram of an IO-Link device in accordance with the state of the art.

The present invention relates to an IO-Link device configured as slave for bidirectional communication with an IO-Link master module.

The automatic monitoring and control of industrial processes is becoming increasingly important for the optimization and configurability of processes. A common connection of monitoring and/or control devices, such as sensors and actuators, with a central control unit is that including a three-conductors cable and/or M8, M12 or M5 connectors.

In recent years, IO-Link® technology for communication with sensors and actuators has spread, offering advanced diagnostics while allowing the use of common cabling in industrial automation systems. In particular, the IO-Link is an I/O (input/output) technology defined by an international standard (IEC 61131-9), which enables serial, bidirectional point-to-point communication from/to sensors and actuators. Since the IO-link is implemented below the fieldbus level, it is possible to work with common control systems. An IO-Link system typically comprises a plurality of IO-Link devices (sensors, RFID readers, motor actuators, etc.) that communicate with a master module, i.e. the IO-Link master, which is essentially a gateway acting as a common interface for the control system using fieldbuses in a configuration in which the IO-Link devices act as I/O bus nodes. The master module communicates with the devices, configured as "slaves", in two modes: a standard I/O mode (SIO mode) in which it provides the supply voltage and an IO-Link mode of bidirectional data communication for parameterization and diagnostics.

Patent US 2015/0143009 concerns the use of an IO link to connect a field device, such as frequency converters, image recognition systems and power supply units, to a master group.

Patent US 2016/0275045 relates to a sensor system to configure the operating margins of a sensor component. In one embodiment, the operating margins generated by the sensor component are received by a physical IO-Link interface.

Patent EP 2161592 describes an optoelectronic sensor provided with a power supply monitoring unit that analyses the supply voltage by comparing it with a reference voltage. A microcontroller determines whether a supply voltage is available as a function of the state of the sensor.

The communication protocol software between master and devices is typically implemented in the microcontroller of the IO-Link master, i.e. protocol stack on the master side, and on the microcontroller of each device, i.e. protocol stack on the device side. The microcontroller of the device executes the IO-Link stack for the transmission of data that can be cyclic (e.g. process, status and speed data) or acyclic (e.g. diagnostic data, configuration parameters and error messages), in response to requests from the master.

An IO-Link device using IO-link mini-stack software has been published by HMT Microelectronics AG at www.hmt.ch.

In the following description and in the subsequent claims, the term "protocol stack" or "stack" is used to indicate the software implementation of the IO-Link communication protocol. The term "device-side stack" refers to the software implementation of the IO-link protocol for the device.

Typically, the device-side IO-Link stack complies with the IO-Link v.1.1 specifications defined by the IO-Link consortium, whose version 1.1.2 is described in the specification "IO-Link Interface and System", Version 1.1.2 Jul. 2013 at www.io-link.com. Page 151 of the document presents a block diagram of the structure and services of an IO-Link device and in particular of the device-side protocol stack. The device-side communication protocol enables synchronous and asynchronous data exchange with the master, and can provide certain features which are available in most IO-Link sensors on the market, such as:

Smart Sensor Profile, which allows a standardization of the use of the IO-Link for the sensors in order to facilitate the replacement of the sensors in the IO-link system without the need to modify the firmware/software on the PLC or master side. The specifications of version 1.0 of March 2017 are described in "IO-*Link Smart Sensor Profile 2nd Edition*", available at the address www.io-link.com.

ISDU (Indexed Service Data Unit) for the asynchronous exchange of parameters;

Data Storage, which makes it possible to automatically save the device parameters on the master storage server and to modify, rewrite or restore the parameters in the device, and Block Parameterization, which allows to transmit a parameter set from a PLC program to the device.

In addition to the microcontroller, the IO-Link device comprises a transceiver, which acts as a physical layer for the microcontroller, the latter, as mentioned above, being configured to execute the protocol. The transceiver can be implemented with a circuit configurable as PNP and NPN or push-pull transistors selectable via external pins.

The sensors can be analog or binary. Binary sensors are often preferred in bus architectures because they eliminate the need for additional process steps for the analog-to-digital and digital-to-analog conversion of signals. In SIO mode, the binary sensors have two states and the output drivers are typically 24 V drivers, on=24 V and off=GND, optimized for the industrial sector.

FIG. 1 schematically shows a common hardware architecture of an IO-Link device. The IO-link device 10 comprises a sensor 11 configured to detect a physical quantity or an actuator configured to control a drive mechanism, for example to control the opening/closing of a valve. For example, the sensor is a photodiode, an inductive proximity sensor or a distance sensor. The device 10 comprises a microcontroller 12, which interfaces with the sensor/actuator 11 and executes the IO-Link protocol stack on the device side, and a transceiver 13, which implements the IO-Link digital interface and acts as a physical layer for communication with the master module.

The device-side IO-Link stack is executed on the microcontroller 12 and communicates with a three-conductors cable 14 ($L^+$, $L^-$ and C/Q) using the physical layer interface 13, typically an SDCI connection system based on the specifications of standard IEC 60947-5-2, e.g. a UART interface with three output pins. The transceiver 13 implements the UART interface for point-to-point communication via the three-conductors cable. In FIG. 1, a first and a second input/output pin 15, 16 of the transceiver 13 are connected to respective $L^+$ (24 V) and $L^-$ (ground) cable conductors for the power supply. A third input/output pin 17 is connected to the C/Q conductor for the switching signal (Q), i.e. the SIO interface, or the IO-Link communication (C). For example, the transceiver is a commercial output driver MAX14821, HMT7742, or L6360.

The transceiver 13 is connected via hardware, typically via an SPI/I2C connection, to the microcontroller 12 and sends and receives data signals to/from the microcontroller. The microcontroller typically comprises a non-volatile memory, e.g. a ROM 18, on which the device-side protocol stack is implemented, which is integrated with the application of the microcontroller which manages the sensor/actuator function (e.g. the optical detection function in the case of a photodiode). The microcontroller can further comprise an analog-to-digital converter for the conversion of the analog signals received by the sensor/actuator component 11, when the sensor output signals 11 are analog.

A protection circuit (not shown) of the internal components at the transceiver output can be provided. A transceiver for an IO-link device equipped with a protection circuit is described in Patent US 2015/0003503.

Figure 2:
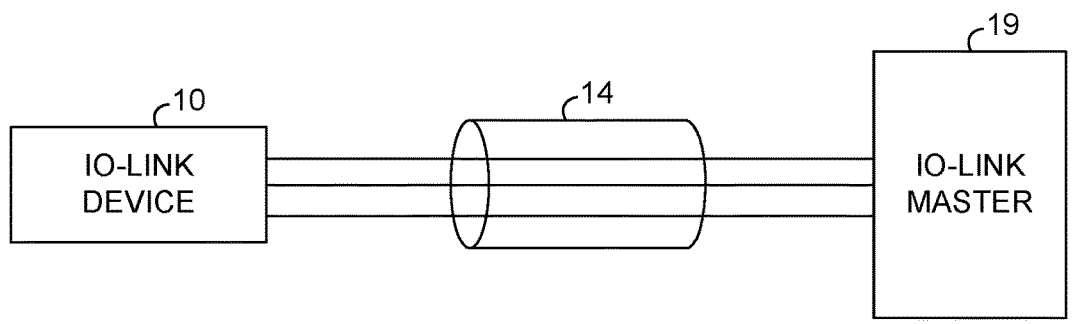
FIG. 2 is a diagram showing an IO-Link system in which the slave device of FIG. 1 is connected to an IO-Link master.

FIG. 2 schematically shows an IO-Link system which comprises the "slave" device 10, generally a plurality of slave devices, connected to a master module 19 via the cable 14. In an IO-Link system based on point-to-point topology, the master module has multiple ports and each device is connected to a respective port via a cable.

Commonly, the main components of an IO-Link device are two hardware components, i.e. the microcontroller chip and the transceiver chip, and two software components, i.e. the device-side protocol stack and the device application which implements the typical functionalities of a sensor/actuator, e.g. peripheral initialization, processing algorithms of data coming from the sensor/actuator and buttons/trimmer management.

Typically, manufacturers of the master module and devices with an IO-Link interface require a third party to create the stack software conforming to the specifications defined by the IO-Link standard. In particular, a sensor or actuator manufacturer that wants to equip its devices with IO-Link communication for use in industrial automation, purchases a device-side IO-Link protocol stack which is adapted to the microcontroller of the device from a software development company to install it in the microcontroller, integrating it in the application of the device. Once the protocol stack is installed and after having connected the microcontroller with an IO-link transceiver at the hardware level, compliance with the IO-Link specifications requires testing on the physical layer, as defined for example by the "IO-Link Test" published on the Internet at www.io-link.com.

In addition to the significant cost of purchasing the protocol stack, the costs of integrating the stack in the device application must be considered.

The Applicant has noted that once the IO-Link stack has been purchased for a specific microcontroller platform, if a microcontroller other than the one for which the protocol stack was purchased is desired, for example, a purchaser wants to switch from an 8-bit microcontroller to a 32-bit one, or wants to purchase a microcontroller from a different manufacturer (even without any variation of the processing capacity), a porting of the protocol stack code must be carried out, with consequent software development costs and longer time-frames for product development.

The Applicant has noted that it would be advantageous to have an IO-Link device available that is easily reconfigurable at a lower software development cost.

According to the present invention, an IO-Link device is provided which is configured as slave for transmitting/receiving signal data with a master module, the IO-link device comprising:

a sensor or actuator configured to output measurement signals;

a first microcontroller operatively coupled to the sensor or actuator and configured to receive the measurement signals and to generate data based on the measurement signals, and a transceiving module comprising a physical layer transceiver configured to receive/transmit signal data from/to the master module, the device comprising a second microcontroller operatively coupled to, and in bidirectional communication with, the physical layer transceiver, wherein the physical layer transceiver is configured to receive signal data associated with a request from the master module and transmit signal data associated with the request to the second microcontroller, and the second microcontroller is configured to receive the signal data from the physical layer transceiver and to execute a device IO-Link protocol stack, the second microcontroller being operatively coupled to, and in bidirectional communication with, the first microcontroller for the transmission of the signal data associated with the request to the first microcontroller and for the reception of data based on the measurement signals from the first controller in response to the signal data associated with the request.

According to the preferred embodiments of the present invention, the transceiving module is implemented with an integrated circuit in a single chip. In particular, the second microcontroller and the physical layer transceiver are arranged on the same physical chip.

Preferably, the first microcontroller of the IO-Link device is off-chip with respect to the transceiving module chip.

Preferably, the chip on which the first microcontroller is implemented lacks a device-side IO-Link protocol stack.

The physical layer transceiver can comprise three input/output pins connectable to respective conductors of a cable, two of the input/output pins to receive electric power supply and a third input/output pin to receive/transmit signal data.

The second microcontroller can be coupled to the first microcontroller through a respective physical layer interface, the physical layer interface of the second microcontroller with the first microcontroller is a master serial interface and the physical layer interface of the first microcontroller is a slave serial interface.

The second microcontroller can be coupled to the physical layer transceiver through a data bus.

The transceiving module can comprise a non-volatile memory operatively coupled to or implemented in the second microcontroller, the IO-Link protocol stack being implemented in said memory. Preferably, the non-volatile memory is implemented in the integrated circuit in the transceiving module chip.

The physical layer transceiver can comprise an input/output interface, wherein the input/output interface is connectable to a three-conductors cable for the connection with a master module.

Figure 3:
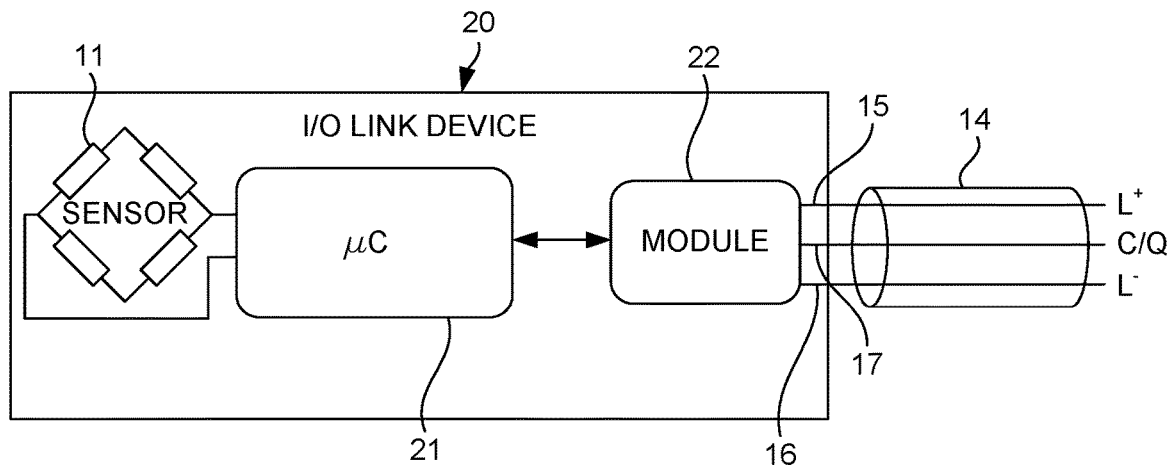
FIG. 3 is a block diagram of an IO-Link device according to an embodiment of the present invention.
Figure 4:
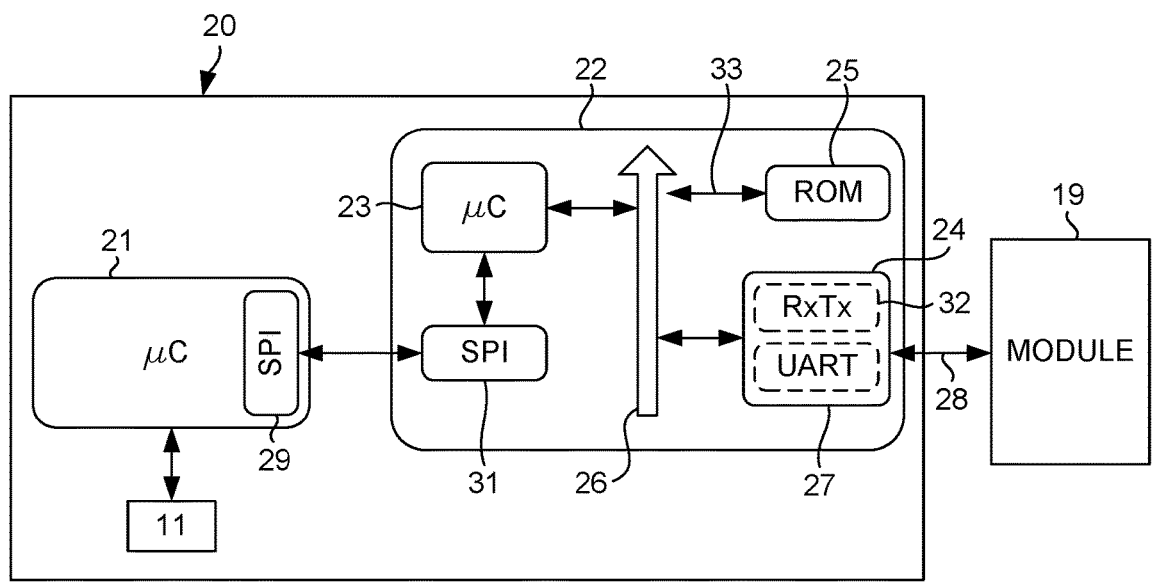
FIG. 4 is a diagram showing the IO-Link device of FIG. 3, in which certain elements of the transceiving module are indicated.

Further characteristics and advantages of the present invention will appear more clearly from the following detailed description of a preferred embodiment thereof, made purely for exemplary, non-limiting purposes, with reference to the appended drawings. In such drawings:

FIG. 1 is an exemplary block diagram of an IO-Link device in accordance with the state of the art;

FIG. 2 is a diagram showing an IO-Link system in which the slave device of FIG. 1 is connected to an IO-Link master;

FIG. 3 is a block diagram of an IO-Link device according to an embodiment of the present invention, and FIG. 4 is a diagram showing the IO-Link device of FIG. 3, in which certain elements of the transceiving module are indicated.

FIG. 3 schematically shows the hardware architecture of an IO-Link device according to an embodiment of the present invention. The same numbers correspond to elements that are the same or have similar functionalities to those described with reference to FIG. 1. In particular, reference number 11 indicates the sensor/actuator and number 14 indicates the three-conductors cable for connection with a master module (not shown). Preferably, the output signals from the sensor/actuator are digital signals. Without limiting the present invention, for the sake of brevity, reference will be made to a sensor 11 in the following detailed description. The IO-link device 20 comprises a first microcontroller 21 operatively coupled to the sensor 11 for receiving and transmitting signals from/to the sensor.

The first microcontroller 21 is configured to generate data based on the signals received by the sensor and to transmit data in response to an external request, preferably in a "slave" mode. The external request originates from the IO-Link master which transmits it to the device.

Typically, in IO-Link communication, the communication between the IO-Link master module and the "slave" device is always active and data is sent to the master in response to requests generated by the latter. According to the IO-Link communication protocol, the data transmitted by the slave device can be process data (relating to measurement signals), value or speed status data, device data (parameters, identification data and diagnostics information) and event data (alarm, error message). The signal data associated with a request can be a "wake-up" message of the device, requests for writing/reading parameters, a diagnostic message or requests for status changes (for example, disabling the pressure of a button or controlling the illumination of a LED that acts as a pointer). The transferred signal data can be transmitted cyclically (process, status and speed data), i.e. it is automatically transmitted as a result of requests generated on a regular basis or acyclically (device or event data), which is transmitted on the master's request. In the following, "signal data" is used to indicate the data input/output to/from the IO-Link device, regardless of its type.

The device 20 comprises a transceiving module 22 operatively coupled to the first microcontroller 21 for the bidirectional communication between the module 22 and the first microcontroller 21 external thereto. FIG. 4 shows a diagram of the device 20 of FIG. 3, in which certain details of the transceiving module 22 are shown. The cable representation has been omitted, symbolically indicating the connection with the IO-Link master module 19 with an arrow 28. Similarly, the sensor is only indicated with a block 11.

The transceiving module 22 comprises a second microcontroller 23 and a transceiver 24 which acts as a physical layer for receiving and transmitting signal data with the master module 19. The physical layer transceiver 24 comprises a reception/transmission circuit ($R_xT_x$) 32 and an input/output interface 27 (of the IO-Link device). The bidirectional communication of the IO-Link device 20 with the master module 19 takes place via the input/output interface 27. Preferably, the interface 27 is a UART interface (Universal Asynchronous Receiver Transmitter), which is implemented in the hardware of the transceiving module, in particular in the physical layer of the transceiver. In this example, the messages received and sent to the master module are coded in bytes according to the UART protocol. The output interface 27 of the device 20 can be connected to a cable 14 with three $L^+$ and $L^-$ and C/Q conductors for connection with the master module. The transceiver 24, in particular its input/output interface 27, comprises three input/output pins: a first and a second pin, connected respectively to the conductors 15 and 16 of the electric power supply cable and a third pin, connected to the conductor 17 for receiving/transmitting signal data, e.g. signal data associated with a request and signal data in response to the request.

The second microcontroller 23 is configured to execute a device-side IO-Link protocol stack and to handle requests from the master module through the transceiver 24. The second microcontroller 23 is operatively coupled with the transceiver 24 and in bidirectional communication through a data bus 26 to which, in the usual ways, transmission means, e.g. conductive cables, are conceptually indicated with double arrows 33. In the present embodiment, the physical layer of the transceiving module 22 for communication with the master module is implemented by the transceiver 24 (i.e. interface 27) and the data bus 26.

According to the preferred embodiments of the present invention, the transceiving module 22 is implemented with an integrated circuit in a single chip, also indicated as transceiver chip. In particular, the second microcontroller 23 and the transceiver 24 are arranged on the same physical chip. In one embodiment, the transceiver chip is an ASIC circuit.

Preferably, the first microcontroller 21 is off-chip with respect to the transceiver chip. For example, the first microcontroller 21 is implemented with an integrated circuit in a separate chip from the transceiver chip.

Preferably, the chip on which the first microcontroller 21 is implemented lacks a device-side IO-Link protocol stack.

The operative coupling between the first microcontroller 21 and the transceiving module 22 for the bidirectional communication between the two components is achieved by an operative coupling between the second microcontroller 23 and the first microcontroller 21 through a respective physical layer interface 31 and 29, preferably a serial interface, e.g. SPI or I2C. The serial interface acts as a peripheral for the respective microcontroller.

Preferably, in the communication between the first and second microcontrollers, the second microcontroller 23 is configured as master and the first microcontroller 21 as slave, preferably using a master serial interface 31 and a slave serial interface 29, respectively. In this communication mode, the second microcontroller 23 receives signal data associated with external requests, i.e. from the master module 19, which are received and transmitted by the transceiver 24 through the UART peripheral 27 and the data bus 26, and manages the requests by executing the device-side protocol stack to transmit these requests to the first microcontroller 21.

Preferably, the second microcontroller 23 is configured, before transmitting a request to the first microcontroller 21 through the SPI 31, to decode the signal data associated with the IO-Link request. In one embodiment, the second microcontroller 23 decodes the IO-Link messages of the master module and re-encodes them (more preferably in a simplified format with respect to the IO-Link packets) for transmitting the request to the first microcontroller 21.

For example, the master module sends a command to the second microcontroller 23 in the form of a "write/read parameters" message, for example the commands READ_REQ, READ and WRITE. The second microcontroller 23 decodes the message by transforming the request into a string of bytes that represents the encoding of the message.

The second microcontroller 23, acting as "master" for the first microcontroller, sends the request to the first "slave" microcontroller according to the master module command through the SPI master 31 and SPI slave 29 interfaces and awaits the response from the first microcontroller.

The first microcontroller 21 responds to the requests of the second microcontroller 23 by receiving the signals from the sensor 11 and producing measurement data that can be processed by the first controller (e.g. data filtering, compensation/calibration algorithms, etc.) prior to its transmission. The signal data output from the first microcontroller 21 is transmitted to the second microcontroller 23. The second microcontroller 23 receives the data from the first microcontroller and transmits it to the transceiver 24 through the serial bus 26 for its sending to the master module 19 through the cable 14, i.e. the C/Q line.

Preferably, the second microcontroller 23 encodes the data coming from the first microcontroller 21 in IO-link format and sends it, e.g. in IO-link packets, to the master module 19 through the physical layer transceiver.

The device-side protocol stack is preferably implemented in a non-volatile memory (ROM) 25 (e.g. EEPROM) connected with the second microcontroller 23 through the serial bus 26. The memory 25 is preferably on-chip in the transceiving module. In the example of FIG. 4, the memory 25 is implemented in the integrated circuit of the transceiver chip, outside the microcontroller 23. However, the present invention contemplates that the memory 25 is integrated in the second microcontroller 23.

According to the present invention, the computational load of the "external" microcontroller (21) is low since it is limited to the control functions of the sensor/actuator component and, in particular, is relieved from the protocol stack management, which is borne by the microcontroller (23) of the transceiving module. For example, the first microcontroller does not necessarily have to handle the "wake-up" requests transmitted by the IO-Link master along the C/Q line, normally a current pulse induced by the master, to start the IO-Link "slave" device. In the present solution, wake-up requests, like the other requests originating from the master module, are managed directly by the transceiving module (22) and sent to the first microcontroller (21).

Since the executable software components are external to the microcontroller that performs the sensor/actuator control functions, the management of the IO-link protocol is substantially decoupled from the type of sensor/actuator of the device, thus increasing the flexibility and configurability of the IO-Link system. In particular, the IO-Link protocol stack can be used in different applications, simply updating/implementing the firmware/software to modify its configuration, resulting in a significant reduction in software/firmware development costs.

The Applicant has noted that the costs of tests on the physical IO-Link layer are generally borne by those who purchase a commercial transceiver because they depend on the implementation of the protocol stack and therefore can only be carried out after the connection has been made with a microcontroller wherein the IO-Link stack has been implemented. Advantageously for purchasers of IO-Link devices, since the transceiving module contains the microcontroller on which the stack is implemented, the hardware tests on the IO-Link devices can be performed by the manufacturer of the transceiving module, before it goes on the market.

Naturally, those skilled in the art may make further modifications and variants to the above-described invention with the purpose of meeting specific and contingent application needs, variants and modifications in any case falling within the scope of protection as defined by the following claims.

What is claimed is:

1. An IO-link device configured as slave for transmitting or receiving signal data with a master module, the IO-link device comprising:
    a sensor or actuator configured to output measurement signals;
    a first microcontroller operatively coupled to the sensor or actuator and configured to receive the measurement signals and to generate data based on the measurement signals, and a transceiving module comprising a physical layer transceiver configured to receive or transmit signal data from or to the master module, the device comprising a second microcontroller operatively coupled to, and in bidirectional communication with, the physical layer transceiver, wherein the physical layer transceiver is configured to receive signal data associated with a request from the master module and to transmit signal data associated with the request to the second microcontroller;

the second microcontroller is configured to receive the signal data from the physical layer transceiver and to execute a device IO-Link protocol stack, the second microcontroller being operatively coupled to, and in bidirectional communication with, the first microcontroller for the transmission of the signal data associated with the request to the first microcontroller and for the reception of data based on the measurement signals from the first microcontroller in response to the signal data associated with the request.

2. The TO link device of claim 1, wherein the transceiving module is implemented with an integrated circuit in a single chip.

3. The device of claim 1, wherein the second microcontroller and the physical layer transceiver are implemented with an integrated circuit in a single chip.

4. The device of claim 1, wherein the physical layer transceiver comprises three input/output pins connectable to respective conductors of a cable, two of the input/output pins to receive electric power supply and a third input/output pin to receive/transmit signal data.

5. The device of claim 1, wherein the second microcontroller is coupled to the first microcontroller through a respective physical layer interface, the physical layer interface of the second microcontroller with the first microcontroller is a master serial interface and the physical layer interface of the first microcontroller is a slave serial interface.

6. The device of claim 1, wherein the second microcontroller is coupled to the physical layer transceiver through a data bus.

7. The device of claim 1, wherein the transceiving module comprises a non-volatile memory operatively coupled to or implemented in the second microcontroller, the TO-Link protocol stack being implemented in said memory.

8. The device according to claim 2, wherein the first microcontroller is off-chip with respect to the chip of the transceiving module.

9. The device of claim 1, wherein the physical layer transceiver comprises an input/output interface, wherein the input/output interface is connectable to a three-conductors cable for the connection with a master module.

10. An TO-link device configured as slave for transmitting or receiving signal data with a master module, the TO-link device comprising:

a sensor or actuator configured to output measurement signals;

a first microcontroller operatively coupled to the sensor or actuator and configured to receive the measurement signals and to generate data based on the measurement signals, and a transceiving module comprising a physical layer transceiver configured to receive or transmit signal data from or to the master module, wherein the transceiving module is implemented with an integrated circuit in a single chip, the device comprising a second microcontroller operatively coupled to, and in bidirectional communication with, the physical layer transceiver, wherein the physical layer transceiver is configured to receive signal data associated with a request from the master module and to transmit signal data associated with the request to the second microcontroller;

the second microcontroller is configured to receive the signal data from the physical layer transceiver and to execute a device IO-Link protocol stack, the second microcontroller being operatively coupled to, and in bidirectional communication with, the first microcontroller for the transmission of the signal data associated with the request to the first microcontroller and for the reception of data based on the measurement signals from the first microcontroller in response to the signal data associated with the request.

11. The device of claim 10, wherein the second microcontroller and the physical layer transceiver are implemented with an integrated circuit in a single chip.

12. The device of claim 10, wherein the physical layer transceiver comprises three input/output pins connectable to respective conductors of a cable, two of the input/output pins to receive electric power supply and a third input/output pin to receive/transmit signal data.

13. The device of claim 10, wherein the second microcontroller is coupled to the first microcontroller through a respective physical layer interface, the physical layer interface of the second microcontroller with the first microcontroller is a master serial interface and the physical layer interface of the first microcontroller is a slave serial interface.

14. The device of claim 10, wherein the second microcontroller is coupled to the physical layer transceiver through a data bus.

15. The device of claim 10, wherein the physical layer transceiver comprises an input/output interface, wherein the input/output interface is connectable to a three-conductors cable for the connection with a master module.

16. An TO-link device configured as slave for transmitting or receiving signal data with a master module, the TO-link device comprising:

a sensor or actuator configured to output measurement signals;

a first microcontroller operatively coupled to the sensor or actuator and configured to receive the measurement signals and to generate data based on the measurement signals, and a transceiving module comprising a physical layer transceiver configured to receive or transmit signal data from or to the master module, the device comprising a second microcontroller operatively coupled to, and in bidirectional communication with, the physical layer transceiver, wherein the second microcontroller and the physical layer transceiver are implemented with an integrated circuit in a single chip, wherein the physical layer transceiver is configured to receive signal data associated with a request from the master module and to transmit signal data associated with the request to the second microcontroller;

the second microcontroller is configured to receive the signal data from the physical layer transceiver and to execute a device TO-Link protocol stack, the second microcontroller being operatively coupled to, and in bidirectional communication with, the first microcontroller for the transmission of the signal data associated with the request to the first microcontroller and for the reception of data based on the measurement signals from the first microcontroller in response to the signal data associated with the request.

17. The TO link device of claim 16, wherein the transceiving module is implemented with an integrated circuit in a single chip.

18. The device of claim 16, wherein the physical layer transceiver comprises three input/output pins connectable to respective conductors of a cable, two of the input/output pins to receive electric power supply and a third input/output pin to receive/transmit signal data.

19. The device of claim 16, wherein the second microcontroller is coupled to the physical layer transceiver through a data bus.

20. The device of claim 17, wherein the physical layer transceiver comprises an input/output interface, wherein the input/output interface is connectable to a three-conductors cable for the connection with a master module.

* * * * *